US012736154B2

(12) United States Patent
Wang

(10) Patent No.: US 12,736,154 B2
(45) Date of Patent: Sep. 15, 2026

(54) ELECTRONIC TIMER FOR MITIGATION OF SOLENOID VALVE WATER HAMMER EFFECT

(71) Applicant: Cheng-Yu Wang, Zhushan Township, Nantou County (TW)

(72) Inventor: Cheng-Yu Wang, Zhushan Township, Nantou County (TW)

( * ) Notice: Subject to any disclaimer, the term of this patent is extended or adjusted under 35 U.S.C. 154(b) by 14 days.

(21) Appl. No.: 19/071,598

(22) Filed: Mar. 5, 2025

(65) Prior Publication Data

US 2026/0266395 A1 Sep. 10, 2026

(51) Int. Cl.
*F16K 47/02* (2006.01)
*F16K 31/06* (2006.01)

(52) U.S. Cl.
CPC ........ *F16K 47/023* (2013.01); *F16K 31/0655* (2013.01)

(58) Field of Classification Search
CPC .................................................... F16K 47/023
See application file for complete search history.

(56) References Cited

U.S. PATENT DOCUMENTS 2,986,368 A * 5/1961 Derek .................. F16K 47/023 251/30.01
3,989,066 A * 11/1976 Sturman .............. F16K 31/402 239/66
10,598,293 B2 * 3/2020 Pearson .................... E03B 7/12
2016/0061334 A1 * 3/2016 Gillespie .................. F16K 1/52 251/118
2023/0228346 A1 * 7/2023 Tzeng .................. E03C 1/0412 4/676

* cited by examiner

*Primary Examiner* — Kelsey E Cary

(57) ABSTRACT

An electronic timer for mitigation of a solenoid valve water hammer effect is provided. The electronic timer comprises a housing defining an internal receiving space, a water pipe extending through the housing with an inlet section and an outlet section connected by a water control section aligned with the internal receiving space, a solenoid control valve integrated into the water control section to regulate fluid flow, a control interface provided on the housing, and a water hammer suppressor positioned between the solenoid control valve and the inlet section. The water hammer suppressor consists of a fluid passage and a buffer assembly, wherein the fluid passage establishes hydraulic communication with the water control section to allow fluid ingress, and the buffer assembly functions to attenuate transient pressure surges, thereby mitigating the water hammer effect.

3 Claims, 6 Drawing Sheets

ELECTRONIC TIMER FOR MITIGATION OF SOLENOID VALVE WATER HAMMER EFFECT

FIELD OF INVENTION

The present invention relates to an electronic timer and, more particularly, to an innovative electronic timer structure designed to mitigate the water hammer effect associated with solenoid valve operation.

BACKGROUND OF THE INVENTION

Electronic timers play a crucial role in automating gardening irrigation and fluid control systems, enabling scheduled water distribution. These devices typically regulate water flow by rapidly switching between open and closed states, allowing users to achieve efficient and automated control.

Since electronic timers rely on the operation of solenoid valves to switch water flow between open and closed states, a significant challenge associated with conventional electronic timers is the generation of water hammer. This hydraulic shock effect occurs due to the abrupt cessation of high-velocity fluid flow, which can impose excessive stress on pipeline joints and system components, potentially leading to premature failure and increased maintenance costs.

Existing solutions, such as externally installed water hammer suppressors, offer partial mitigation. However, their implementation in multi-outlet irrigation systems is often impractical due to labor-intensive installation processes and significant costs. As a result, an integrated approach is essential to effectively address this issue.

SUMMARY OF THE INVENTION

The main purpose of the present invention is to provide an electronic timer that inherently mitigates the water hammer effect associated with solenoid valve operation. This is accomplished through an optimized structural design of the electronic timer, enhancing both practicality and innovation.

To achieve the aforementioned purpose, the electronic timer comprises a housing, which is a structurally hollow enclosure defining an internal receiving space. A water pipe extends through the housing, featuring an inlet section and an outlet section at its respective ends to facilitate the ingress and egress of fluid. These sections are connected by a water control section, which is aligned with the internal receiving space of the housing. A solenoid control valve is integrated into the water control section to regulate the flow of fluid within the water pipe. A control interface is provided on the housing and includes multiple control keys for configuring the automated operational timing of the fluid flow in the water pipe. Additionally, a water hammer suppressor is positioned between the solenoid control valve and the inlet section. This suppressor consists of a fluid passage and a buffer assembly. The fluid passage establishes hydraulic communication with the water control section to allow fluid ingress, while the buffer assembly functions to attenuate transient pressure surges, thereby mitigating the water hammer effect.

By implementing this novel structural configuration and its associated technical features, the present invention significantly advances the prior art by integrating the water hammer suppressor designed to absorb and attenuate pressure surges. This mechanism effectively mitigates the harmful effects of water hammer, not only prolonging the operational lifespan of the electronic timer but also enhancing its industrial applicability and efficiency.

Additionally, the buffer assembly within the water hammer suppressor comprises a tube seat, a reciprocating piston, a biasing spring, and a cap. The tube seat is axially aligned and hydraulically connected to the exterior of the fluid passage, defining a sliding cavity and a mounting port within it. The reciprocating piston is slidably positioned within the sliding cavity, and the cap is attached to the mounting port. The biasing spring is positioned between the reciprocating piston and the cap, providing a resilient force that urges the reciprocating piston toward the fluid passage.

A further technical enhancement of the present invention is the inclusion of a regulating bolt within the cap. The cap is designed with a through hole featuring an internal thread section that engages with the threaded regulating bolt. This regulating bolt comprises a pressing end, a rotationally driven end, and a recess cavity. The pressing end interfaces with the biasing spring to adjust its pre-load tension. The periphery of the regulating bolt includes an external thread section, which engages with the internal thread section of the through hole, enabling controlled axial translation of the regulating bolt relative to the cap. By rotating the regulating bolt clockwise or counterclockwise, the height of the pressing end can be adjusted, thereby modulating the compressive force of the biasing spring. The rotationally driven end of the regulating bolt extends to a predetermined point on the housing and includes a tool engagement portion to allow manual adjustment using an appropriate tool. Additionally, the recess cavity of the regulating bolt accommodates a guide rod extended from one end of the reciprocating piston, ensuring unimpeded axial displacement of the piston. This configuration facilitates controlled modulation of the spring's elastic force, enabling the water hammer suppressor to be tailored to varying hydraulic conditions and optimizing performance across diverse applications.

DETAILED DESCRIPTION OF THE PREFERRED EMBODIMENTS

Figure 1:
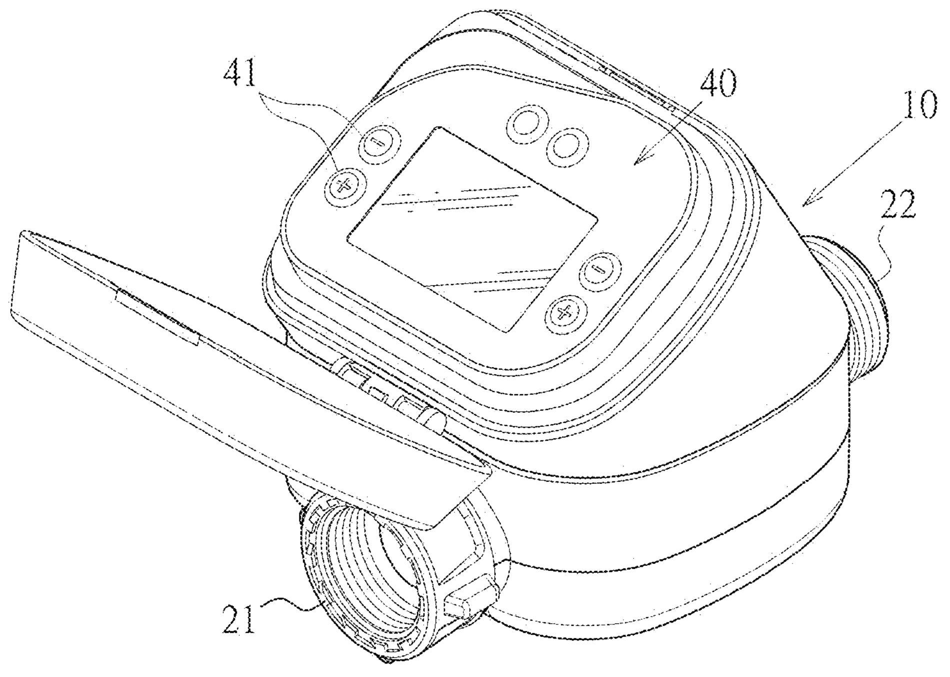
FIG. 1 is a perspective view of a preferred embodiment of the assembled electronic timer of the present invention.
Figure 2:
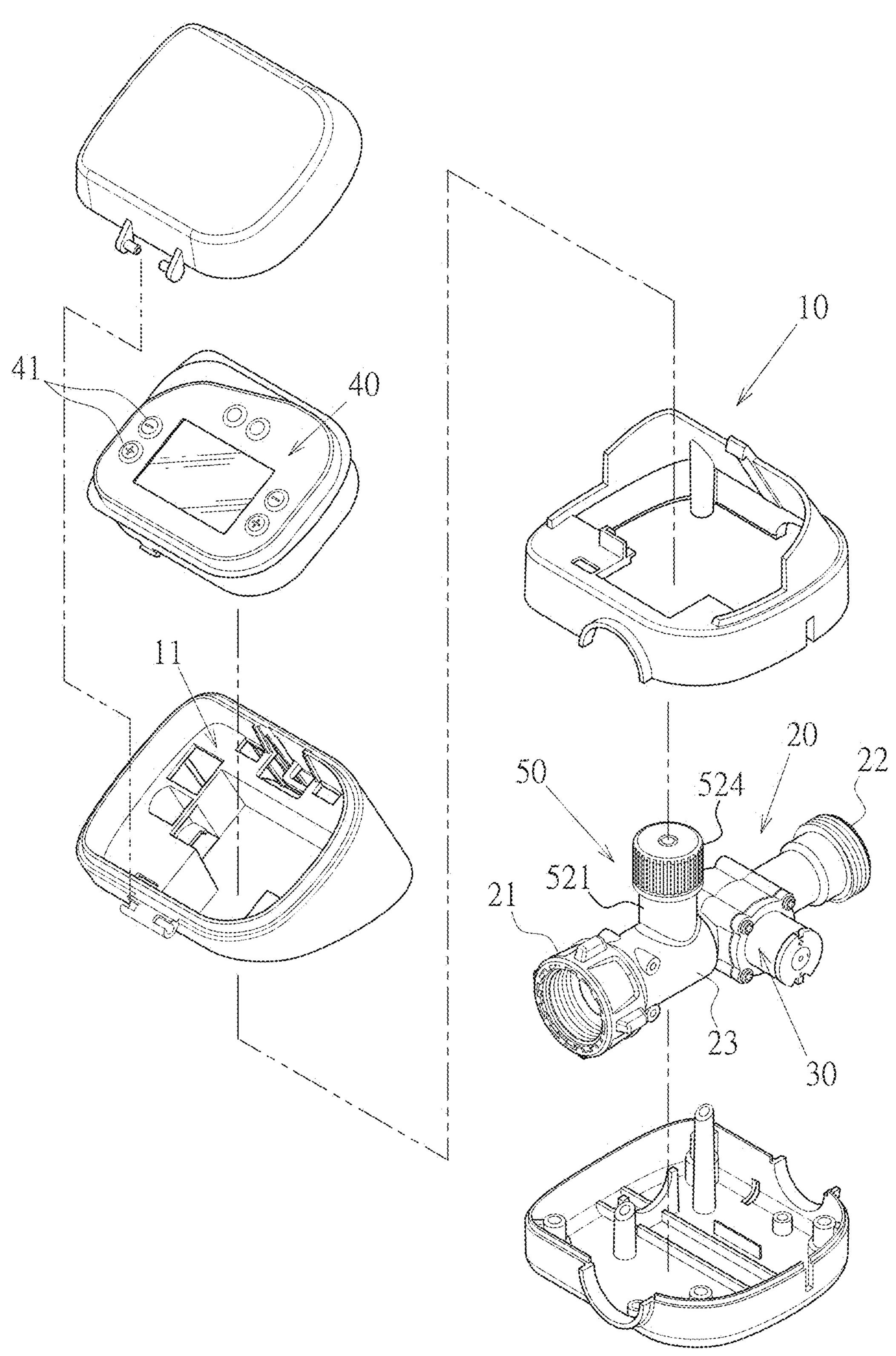
FIG. 2 is an exploded perspective view of the main components of the preferred embodiment.

Reference is made to FIGS. 1 to 5, which illustrate a preferred embodiment of the electronic timer designed to mitigate the water hammer effect induced by solenoid valve operation. The embodiments disclosed herein serve as exemplifications of the principles of the invention and should not be construed as imposing any limitations on the scope of the patent application.

The electronic timer comprises a housing 10, which is a structurally hollow enclosure defining an internal receiving space 11. A water pipe 20 extends through the housing 10, featuring an inlet section 21 and an outlet section 22 at its respective ends to facilitate the ingress and egress of fluid. These sections are connected by a water control section 23, which is aligned with the internal receiving space 11 of the housing 10. A solenoid control valve 30 is integrated into the water control section 23 to regulate the flow of fluid within the water pipe 20. A control interface 40 is provided on the housing 10 (not limited to its upper surface) and includes multiple control keys 41 for configuring the automated operational timing of the fluid flow in the water pipe 20. A water hammer suppressor 50 is positioned between the solenoid control valve 30 and the inlet section 21. This suppressor consists of a fluid passage 51 and a buffer assembly 52. The fluid passage 51 establishes hydraulic communication with the water control section 23 to allow fluid ingress, while the buffer assembly 52 functions to attenuate transient pressure surges, thereby mitigating the water hammer effect. The buffer assembly 52 comprises a tube seat 521, a reciprocating piston 522, a biasing spring 523, and a cap 524. The tube seat 521 is axially aligned and hydraulically connected to the exterior of the fluid passage 51, defining a sliding cavity 525 and a mounting port 526, the reciprocating piston 522 is slidably positioned within the sliding cavity 525 (sealed by an O-ring 54), the cap 524 is attached to the mounting port 526, and the biasing spring 523 is positioned between the reciprocating piston 522 and the cap 524, providing a resilient force that urges the reciprocating piston 522 toward the fluid passage 51.

Figure 3:
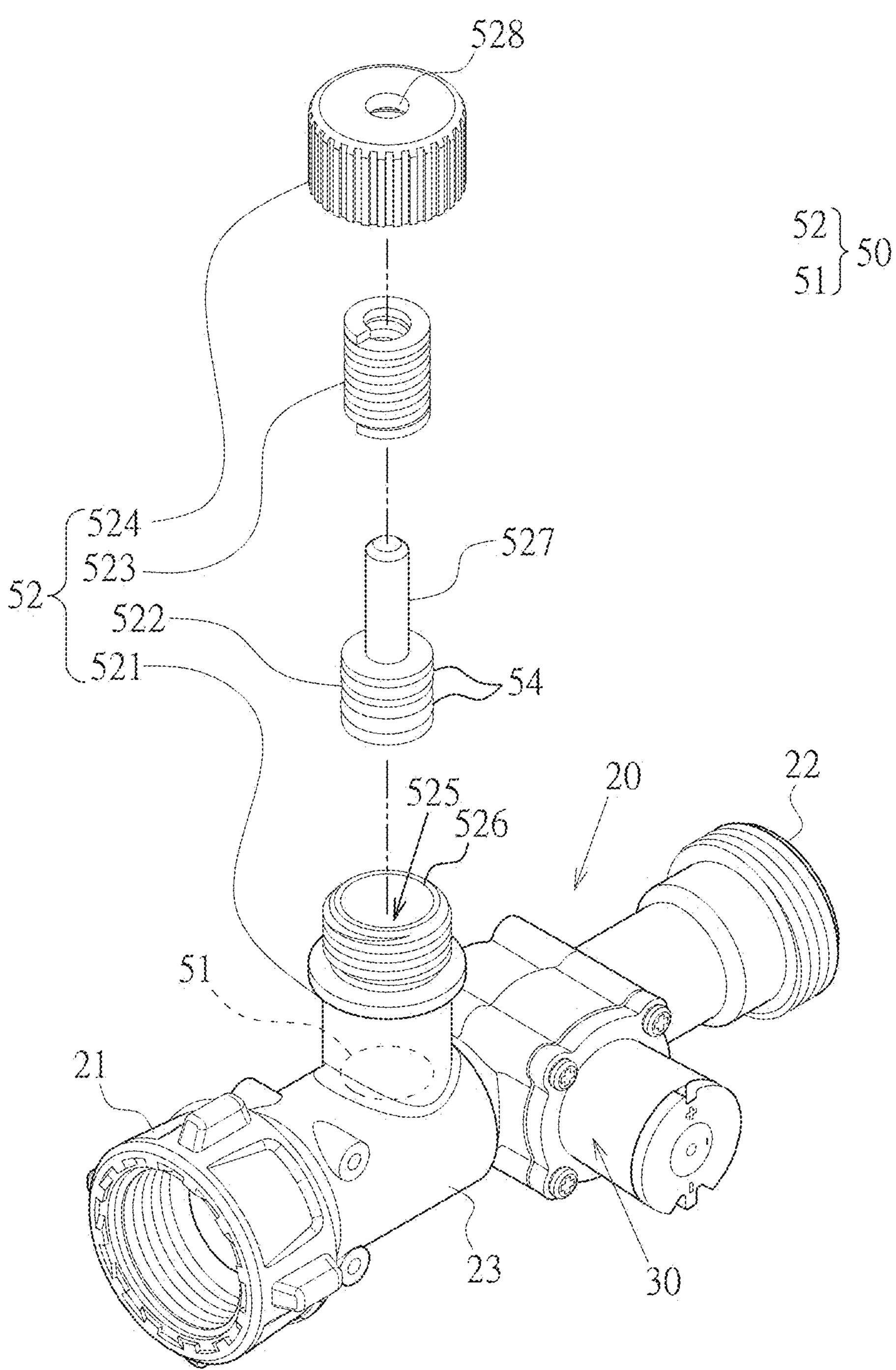
FIG. 3 is an exploded perspective view of the buffer assembly of the water hammer suppressor.
Figure 4:
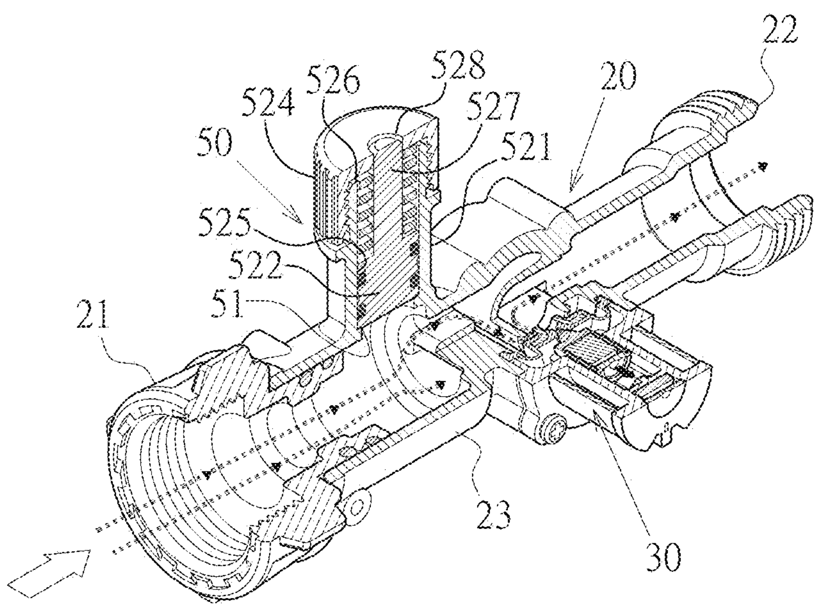
FIG. 4 is a schematic diagram of the fluid flow state during solenoid valve activation.

As shown in FIGS. 3 and 4, the reciprocating piston 522 further comprises a guide rod 527 extending from one end thereof, and the cap 524 defines a through hole 528 to allow the guide rod 527 to extend through. This guide rod 527 ensures axial stability during piston motion, preventing lateral displacement and enabling precise actuation.

Figure 6:
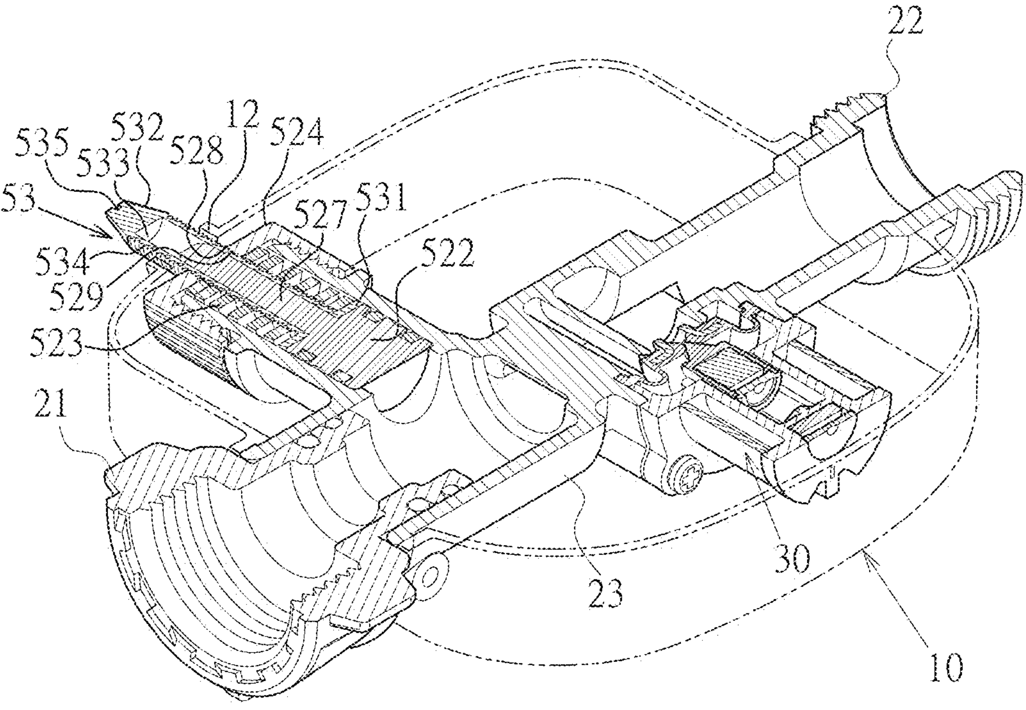
FIG. 6 is a diagram of an embodiment of the adjustable spring force of the water hammer suppressor.
Figure 7:
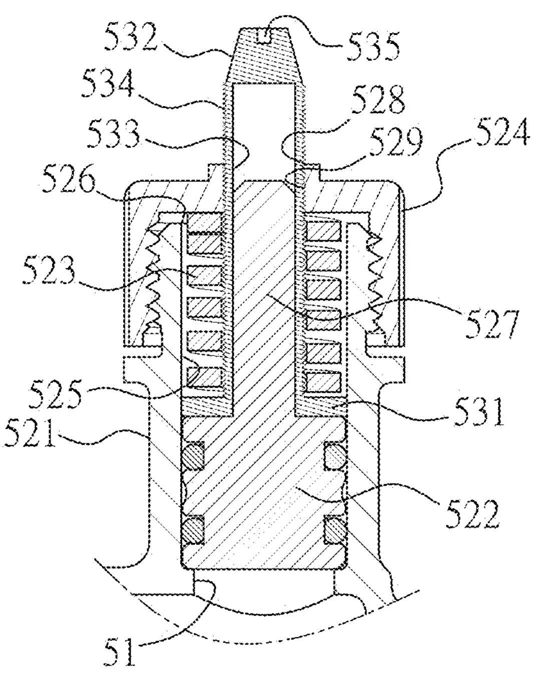
FIG. 7 is a schematic diagram of the adjustable spring state (1) of the water hammer suppressor.
Figure 8:
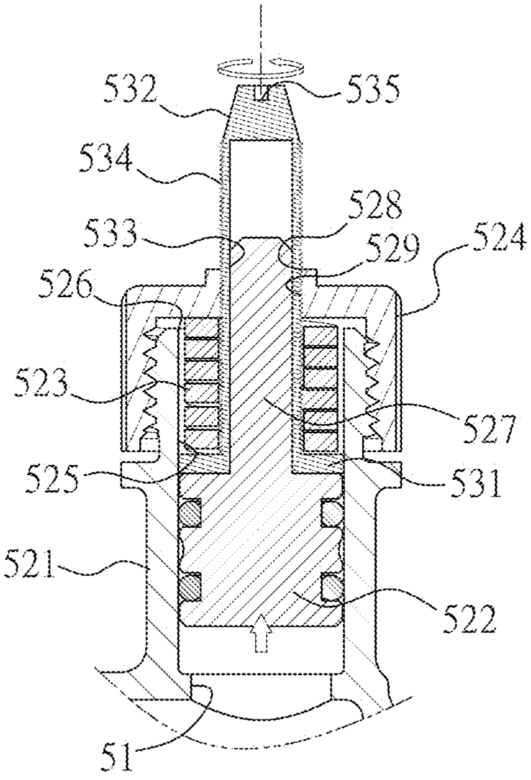
FIG. 8 is a schematic diagram of the adjustable spring state (2) of the water hammer suppressor.

As shown in FIG. 6, the through hole 528 in the cap 524 includes an internal thread section 529, which facilitates the integration of a regulating bolt 53. This bolt 53 comprises a pressing end 531, a rotationally driven end 532, and a recess cavity 533. The pressing end 531 interfaces with the biasing spring 523 to adjust its pre-load tension. The periphery of the regulating bolt 53 features an external thread section 534, which engages with the internal thread section 529 of the through hole 528, enabling controlled axial translation of the regulating bolt 53 relative to the cap 524. By rotating the regulating bolt 53 clockwise or counterclockwise, the height of the pressing end 531 can be adjusted, thereby modulating the compressive force of the biasing spring 523 (as illustrated by the variations shown in FIGS. 7 and 8). The driven end 532 extends to a predetermined point on the housing 10, where an opening 12 can demonstrate the driven end 532 position (either in a recessed or protruding state). The driven end 532 includes a tool engagement portion 535, such as a flathead, Phillips, or hexagonal recess, to allow manual adjustment using an appropriate tool (e.g., screwdriver or wrench, not shown). Additionally, the recess cavity 533 accommodates the guide rod 527, ensuring unimpeded axial displacement of the reciprocating piston 522.

Figure 5:
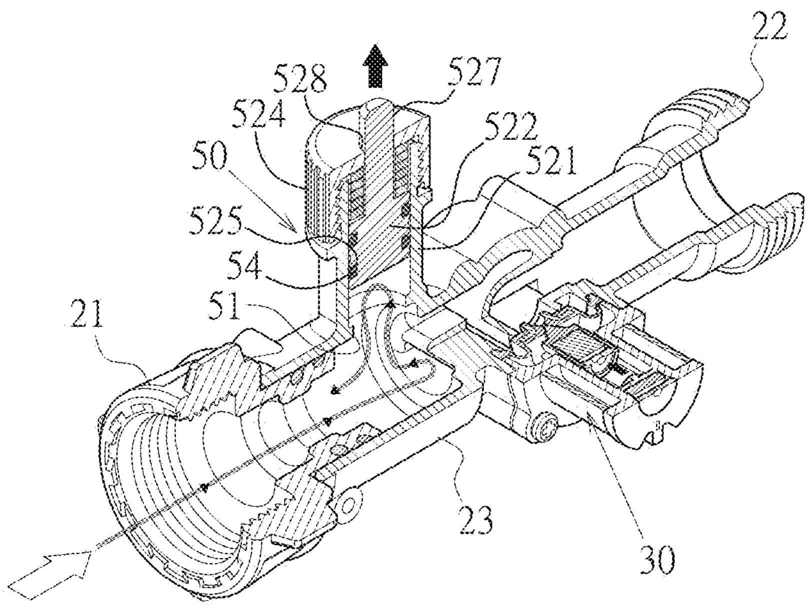
FIG. 5 is a schematic diagram of the water hammer suppressor operating state during solenoid valve closure.

The aforementioned structural configuration allows for an effective water hammer mitigation mechanism within the electronic timer. As shown in FIG. 4, when the solenoid control valve 30 is actuated to the open position, fluid flows unimpeded through the water pipe 20. Conversely, as shown in FIG. 5, when the solenoid control valve 30 is closed, the abrupt cessation of flow generates a hydraulic shock which is redirected toward the fluid passage 51 of the water hammer suppressor 50. In this scenario, the buffer assembly 52 dynamically engages to absorb and attenuate the resulting pressure surge, thereby mitigating the harmful effects of water hammer. This mechanism not only prolongs the operational lifespan of the electronic timer, but also enhances the overall reliability of the system.

What is claimed is:

1. An electronic timer for mitigation of a solenoid valve water hammer effect, comprising:

a housing, which is a structurally hollow enclosure defining an internal receiving space;

a water pipe extending through the housing, featuring an inlet section and an outlet section at its respective ends to facilitate the ingress and egress of fluid, wherein the inlet section and the outlet section are connected by a water control section aligned with the internal receiving space of the housing;

a solenoid control valve integrated into the water control section to regulate the flow of fluid within the water pipe;

a control interface provided on the housing and including multiple control keys for configuring an automated operation timing of the fluid flow in the water pipe; and a water hammer suppressor positioned between the solenoid control valve and the inlet section, the water hammer suppressor consisting of a fluid passage and a buffer assembly, wherein the fluid passage establishes hydraulic communication with the water control section to allow fluid ingress, and the buffer assembly functions to attenuate transient pressure surges, thereby mitigating the water hammer effect;

wherein the buffer assembly comprises a tube seat, a reciprocating piston, a biasing spring, and a cap, the tube seat being axially aligned and hydraulically connected to the exterior of the fluid passage, defining a sliding cavity and a mounting port, the reciprocating piston being slidably positioned within the sliding cavity, the cap being attached to the mounting port, and the biasing spring being positioned between the reciprocating piston and the cap to provide a resilient force that urges the reciprocating piston toward the fluid passage.

2. The electronic timer according to claim 1, wherein the reciprocating piston further comprises a guide rod extending from one end thereof, and the cap defines a through hole to allow the guide rod to extend through.

3. The electronic timer according to claim 2, wherein the through hole in the cap includes an internal thread section, and a regulating bolt is provided, the regulating bolt comprising a pressing end, a rotationally driven end, and a recess cavity, wherein the pressing end interfaces with the biasing spring to adjust its pre-load tension, the regulating bolt having an external thread section on its periphery that engages with the internal thread section of the through hole to enable controlled axial translation of the regulating bolt relative to the cap by rotating the regulating bolt clockwise or counterclockwise, thereby adjusting the height of the pressing end and modulating the compressive force of the biasing spring, the driven end extending to a predetermined point on the housing and including a tool engagement portion for manual adjustment using an appropriate tool, and the recess cavity accommodating the guide rod to ensure unimpeded axial displacement of the reciprocating piston.

* * * * *